United States Patent
Xu et al.

(10) Patent No.: US 12,200,007 B2
(45) Date of Patent: Jan. 14, 2025

(54) DETECTION OF MALICIOUS ON-CHAIN PROGRAMS

(71) Applicant: Coinbase, Inc., Oakland, CA (US)

(72) Inventors: Yifan Xu, San Diego, CA (US);
Ziqiang Liu, Great Neck, NY (US);
Indra Rustandi, Oakland, CA (US);
Yao Ma, Scarsdale, NY (US)

(73) Assignee: Coinbase, Inc., Oakland, CA (US)

( * ) Notice: Subject to any disclaimer, the term of this patent is extended or adjusted under 35 U.S.C. 154(b) by 261 days.

(21) Appl. No.: 17/845,694

(22) Filed: Jun. 21, 2022

(65) Prior Publication Data

US 2023/0412639 A1 Dec. 21, 2023

(51) Int. Cl.
*H04L 9/40* (2022.01)
*G06N 5/01* (2023.01)
*H04L 9/00* (2022.01)
*H04L 41/16* (2022.01)

(52) U.S. Cl.
CPC .............. *H04L 63/145* (2013.01); *G06N 5/01* (2023.01); *H04L 9/50* (2022.05); *H04L 41/16* (2013.01); *H04L 63/1416* (2013.01)

(58) Field of Classification Search
CPC ......... H04L 63/145; H04L 9/50; H04L 41/16; H04L 63/1416; H04L 9/0891; H04L 41/0604; H04L 41/082; H04L 41/145; G06N 5/01; G06N 20/00; G06N 20/20
See application file for complete search history.

(56) References Cited

U.S. PATENT DOCUMENTS

| | | | |
|---|---|---|---|
| 2019/0273739 A1* | 9/2019 | Pemmaraju | H04L 63/0884 |
| 2023/0086191 A1* | 3/2023 | Jakobsson | H04L 9/3231 705/66 |
| 2023/0325833 A1* | 10/2023 | Chen | G06Q 20/4014 705/75 |

* cited by examiner

*Primary Examiner* — Joe Chacko
(74) *Attorney, Agent, or Firm* — Foley & Lardner LLP

(57) ABSTRACT

Methods and systems are described herein for a malware detection system that detects whether an on-chain program associated with a cryptographic token is malicious based on output of a machine learning model. The malware detection system may retrieve or generate attributes associated with an on-chain program and input those into a plurality of scripts within a malware detection script database to determine whether the on-chain program is malicious. The scripts may be generated based on an output of a machine learning model indicating whether the on-chain program is malicious.

18 Claims, 7 Drawing Sheets

200

| Attribute | Value |
|---|---|
| Hash | cf5e2060e64605e824da47536a3cad23b5979b611fafa92720ccd19fb2b6c1c8 |
| Source Address | bc1qhkz9cqvtgnl27l22zt4t7qfpg8ujfrq5dpxd0z |
| Target Address | bc1q9yaw4g2zt2j8ye2jk06kk9u5p4kduvgdusjuzz |
| Contract Address | 0x321162Cd933E2Be498Cd2267a90534A804051b11 |

203 (Attribute column)
209 (Value column)

FIG. 2

| Creation Block | Number of Holders | Number of Transfers | Earliest Transfer | Latest Transfer |
|---|---|---|---|---|
| <Data> | 100 | 50 | <Date> | <Date> |

| Malicious? 503 | Address 506 |
|---|---|
| False | 0xdAC17F958D2ee523a2206206994597C13D831ec7 |
| False | 0xA0b86991c6218b36c1d19D4a2e9Eb0cE3606eB48 |
| False | 0x95aD61b0a150d79219dCF64E1E6Cc01f0B64C4cE |
| True | 0x95aD61b0a150d79219dCF64E1E6Cc01f0B64C5aa |

FIG. 5

DETECTION OF MALICIOUS ON-CHAIN PROGRAMS

BACKGROUND

In recent years, the use of blockchains and blockchain technology has exponentially increased. Blockchains include lists of records, called "blocks," that are "chained" together using cryptography. Each block may include data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Many current blockchains allow creation of new cryptographic tokens that may be exchanged for other cryptographic tokens or otherwise sent and received between users. Thus, there is a large number of these cryptographic tokens that exist and more new ones are getting created daily/weekly/monthly. Generally, cryptographic tokens are created using an on-chain program (e.g., a smart contract). There have been some on-chain programs that were designed with malicious intent (e.g., designed to steal user's valuable cryptographic tokens in exchange for tokens generated by the malicious on-chain program). Accordingly, a mechanism is needed to determine whether a particular new cryptographic token is associated with a malicious on-chain program and thus, should not be acquired.

SUMMARY

Therefore, methods and systems are described herein for detecting cryptographic tokens associated with malicious on-chain programs using scripts stored in a malware detection script database that is updated based on outputs of a machine learning model. A malware detection system may be used to perform operations disclosed herein. The malware detection system may detect a first on-chain program corresponding to a first cryptographic token for a first blockchain network. For example, the malware detection system may execute a process to detect one or more new on-chain programs added to the first blockchain program. In another example, a user may desire to acquire one or more cryptographic tokens associated with the first on-chain program (e.g., cryptographic tokens minted by the on-chain program).

The malware detection system may determine a first attribute set for the first cryptographic token. The first attribute set may include attributes retrieved from the first on-chain application that generated (e.g., minted) the cryptographic tokens such as the name of the token, the symbol of the token, and/or the total supply of the token. Furthermore, the first set of attributes may include creation block data, number of transfers, transfer end block, number of holders, transfer duration block, transfer start block, and/or other suitable attributes. In some embodiments, the malware detection system may interact with the first on-chain program to identify other attributes. For example, the malware detection system may fork the first blockchain and attempt to perform a buy and/or sell operations to determine whether those operations succeed and whether there are any other transfer barriers (e.g., fees) that may be incurred by performing each transfer.

The malware detection system may then process the first attribute set using a plurality of scripts stored in a malware detection script database that identifies cryptographic tokens as corresponding to a malicious on-chain program. One or more of the plurality of scripts may have been generated based on outputs of a machine learning model. For example, the malware detection script database may store a multitude of scripts that were generated based on attributes that were determined to correspond to malicious on-chain programs. That is, when the machine learning model determines that a particular on-chain program is malicious, the malware detection system may generate or cause a script to be generated for identifying cryptographic tokens associated with the malicious on-chain program. In some embodiments, the malware detection system may generate a warning (e.g., a message) to a user to create a malware detection script based on the output of the machine learning model.

The machine learning model may be trained using a multitude of attributes sets. Thus, a training routine of the machine learning model may receive a plurality of attribute sets associated with respective labeled on-chain programs corresponding to respective labeled cryptographic tokens. Each attribute set may include a value for one or more of creation block data, number of holders, number of transfers, transfer duration, earliest transfer, or latest transfer for each labeled cryptographic token of the respective labeled cryptographic tokens. In some embodiments, the training routine of the machine learning model may generate a plurality of vectors based on those attribute sets and may train the machine learning model to generate outputs of whether attributes for inputted cryptographic tokens indicate a malicious on-chain program.

In response to processing the first attribute set using the plurality of scripts, the malware detection system may generate a warning corresponding to the first cryptographic token. For example, the malware detection system may indicate that the cryptographic token is associated with a malicious on-chain program and transmit that warning to a user device. In some embodiments, the warning may include a plurality of attributes that indicate that the on-chain program is malicious. The user may generate a new script using those attributes and add the script to the malware detection script database. In some embodiments, the malware detection system may generate the malware detection script automatically using the attributes that caused the on-chain program to be identified as malicious. The malware detection system may add the script to the malware detection script database automatically as well.

In some embodiments, based on determining that one or more cryptographic tokens are associated with a malicious on-chain program, the malware detection system may prevent one or more users from acquiring the one or more tokens. That is, the malware detection program may reject any transactions involving the particular cryptographic token type. However, if the on-chain program is not determined to be malicious, the malware detection program may allow the transactions to proceed.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates a data structure representing an example of blockchain operation data, in accordance with one or more embodiments of this disclosure.

FIG. 3 illustrates a data structure representing attributes associated with a cryptographic token, in accordance with one or more embodiments of this disclosure.

FIG. 5 illustrates a sample data within the malware script database, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
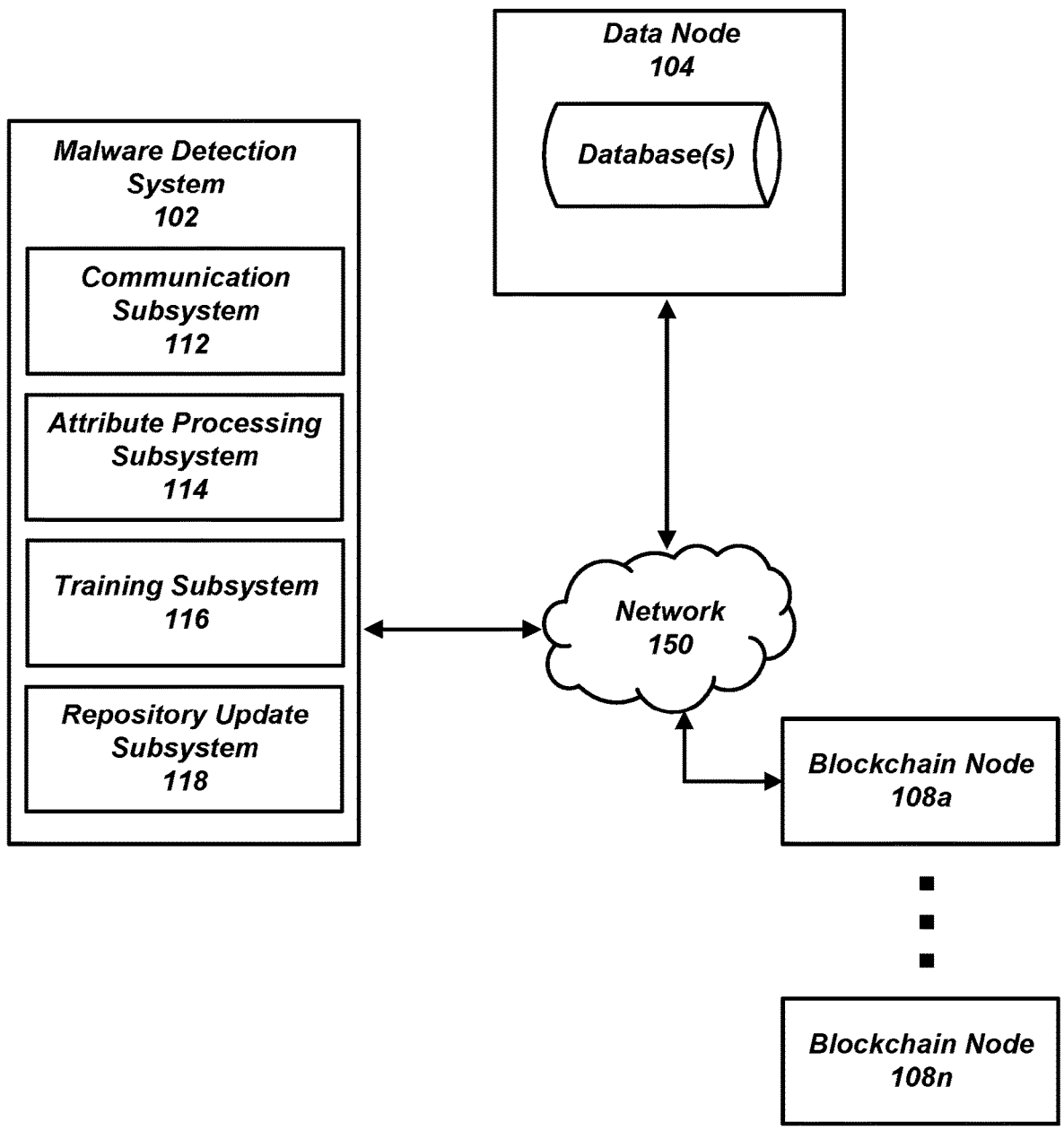
FIG. 1 shows an illustrative system for detecting cryptographic tokens associated with malicious on-chain programs using scripts stored in a malware detection script database that is updated based on outputs of a machine learning model, in accordance with one or more embodiments of this disclosure.

FIG. 1 is an example of environment 100 for detecting cryptographic tokens associated with malicious on-chain programs using scripts stored in a malware detection script database updated based on outputs of a machine learning model. As referred to herein, the term on-chain program may refer to a smart contract deployed on a blockchain that enables generating (e.g., minting) cryptographic tokens on the blockchain. The cryptographic tokens may be exchanged with other cryptographic tokens via blockchain operations. As referred to herein, the term cryptographic token may refer to a set of attributes stored together on blockchain that represent a token. For example, a cryptographic token may be an Ethereum token or a Bitcoin token.

Environment 100 includes malware detection system 102, data node 104, and blockchain nodes 108a-108n. Malware detection system 102 may execute instructions for detecting cryptographic tokens associated with malicious on-chain programs using scripts stored in a malware detection script database. Malware detection system 102 may include software, hardware, or a combination of the two. For example, malware detection system 102 may be hosted on a physical server or a virtual server that is running on a physical computer system. In some embodiments, malware detection system 102 may be configured on a user device (e.g., a laptop computer, a smart phone, a desktop computer, an electronic tablet, or another suitable user device).

Data node 104 may store various data, including one or more machine learning models, training data, the malware detection script database, and/or other suitable data. In some embodiments, data node 104 may also be used to train the machine learning model. Data node 104 may include software, hardware, or a combination of the two. For example, data node 104 may be a physical server, or a virtual server that is running on a physical computer system. In some embodiments, malware detection system 102 and data node 104 may reside on the same hardware and/or the same virtual server/computing device. Network 150 may be a local area network, a wide area network (e.g., the Internet), or a combination of the two. Blockchain nodes 108a-108n may be computing devices configured to receive, authorize, and record transactions onto one or more blockchains.

Malware detection system 102 may detect a first on-chain program corresponding to a first cryptographic token for a first blockchain network. Malware detection system 102 may detect the first on-chain program when receiving a request to perform a blockchain operation that includes transaction data. The first blockchain operation may include exchanging the first cryptographic token with a second cryptographic token. For example, a user may desire to acquire the first cryptographic token associated with the first on-chain program. Some of the transaction data is illustrated in FIG. 2. Thus, FIG. 2 illustrates data structure 200 representing some blockchain operation data (e.g., transaction data). Field 203 may store an attribute associated with the blockchain operation. There may be several attributes to each blockchain operation including, but not limited to, a hash, source address (e.g., a blockchain address of a cryptography-based storage application from which the cryptographic tokens will be removed), a target address (e.g., a blockchain address of a cryptography-based storage application to which the cryptographic tokens will be added), and a contract address (e.g., an address of the on-chain program). Other attributes that are not shown in FIG. 2 may be included in the transaction data. Field 209 may include corresponding values for the attribute names.

In some embodiments, malware detection system 102 may receive results of an audit of the blockchain (e.g., an audit of new/old smart contracts on the blockchain). The audit may identify smart contracts that exists on a specific blockchain and also identify cryptographic tokens associated with those smart contracts. For example, malware detection system 102 may query a blockchain node associated with the first blockchain network (e.g., one of blockchain nodes 108a-108n). The query may include a request for on-chain program information (e.g., smart contract information) including addresses of smart contracts existing on the blockchain.

Malware detection system 102 may receive the transaction data and/or the audit data using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the transaction data and/or the audio data from data node 104 or from another computing device. Communication subsystem 112 may pass the sound, or a pointer to the sound data in memory, to attribute processing subsystem 114.

Attribute processing subsystem 114 may include software components, hardware components, or a combination of both. For example, attribute processing subsystem 114 may include software components that collect and generate (e.g., using hardware components) attributes associated with on-chain programs and store. In some embodiments, attribute processing subsystem 114 may determine a first attribute set for the first cryptographic token. For example, attribute processing subsystem 114 may retrieve, from the blockchain operation data, an identifier (e.g., a contract address on the blockchain) associated with the on-chain program associated with the first cryptographic token. Using the identifier, processing subsystem 114 may interrogate the on-chain program for any attributes and store those attributes (e.g., in memory).

In some embodiments, attribute processing subsystem 114 may perform a discovery script routine on the first on-chain program corresponding to the first cryptographic token. For example, attribute processing subsystem 114 may perform a variety of operations as part of the discovery script routine. Attribute processing subsystem 114 may query the creation block associated with the cryptographic token and extract the attributes within the creation block. Furthermore, attribute processing subsystem 114 may query the blockchain for a number of holders of the first cryptographic tokens. For example, the smaller the number of holders the more likely that the on-chain program (e.g., the smart contract) is malicious. Additionally or alternatively, attribute processing subsystem 114 may retrieve attributes such as number of transfers, transfer duration block (e.g., the speed of transfer), transfer end block and transfer start block.

In some embodiments, attribute processing subsystem 114 may fork the first blockchain so that direct interaction with the on-chain application becomes possible. That is, attribute processing subsystem 114 may generate a copy of the blockchain and use a sandbox (e.g., testing) blockchain node to execute one or more blockchain operations against the on-chain program. For example, attribute processing subsystem 114 may attempt to acquire one or more cryptographic tokens associated with the on-chain program. In the process of acquiring the cryptographic tokens, attribute processing subsystem 114 may determine that the on-chain program requires other/more compensation for acquiring the cryptographic tokens (e.g., hidden fees, etc.). In addition, attribute processing subsystem 114 may attempt to divest the cryptographic tokens using the on-chain program. Thus, if attribute processing subsystem 114 is unable to divest (e.g., sell, exchange, etc.) the tokens or the price of the token when selling, attribute processing subsystem 114 may determine that there is a problem with the on-chain program and that on-chain program is malicious. In some embodiments, the determinations when forking the blockchain may be added to the first set of attributes. Accordingly, attribute processing subsystem 114 may receive the first attribute set based on the discovery script routine.

Attribute processing subsystem 114 may then process the first attribute set using a plurality of scripts stored in a malware detection script database that identifies cryptographic tokens as corresponding to a malicious on-chain program. The plurality of scripts may be based on outputs of a machine learning model. In some embodiments, attribute processing subsystem 114 may input an identifier associated with the cryptographic tokens (e.g., token address) to determine whether the token address is on a list of tokens associated with malicious on-chain programs.

In some embodiments, a portion or a full attribute set may be used as input to the scripts within the malware detection script database. FIG. 3 illustrates a data structure 300 representing attributes associated with a cryptographic token. Field 303 may include creation block data. For example, creation block data in field 303 may include cryptographic address of a creator of the token, token creation time, etc. Field 306 stores a number of holders of the token. There are various tools that enable discovery of the number of holders. Field 309 stores a number of transfers of the cryptographic token. For example, the smaller the number of holders and the number of transfers associated with a particular cryptographic token, the higher the likelihood is that the token is associated with a malicious on-chain program (e.g., the on-chain program is designed to steal your funds). The cryptographic token associated with a malicious on-chain program may be referred to as a scam token. Field 312 may store an earliest transfer date and field 315 may store a latest transfer date. For example, the later the earliest transfer date (e.g., the newer the token), the more likely the cryptographic token is to be associated with a malicious on-chain program. In addition, the earlier the latest transfer date (e.g., people have not been able to transfer the token and/or there is no liquidity), the more likely a token is a scam token. Data structure 300 may include other fields with other attributes (e.g., results of transactions performed when the blockchain is forked). For example, the amount of funds it takes to make transfers and whether transfer can be made.

As discussed above, a portion or all the attributes may be used as inputs into various scripts within the malware detection script database. Each script may be designed to analyze some or all attributes that have been collected by attribute processing subsystem 114. For example, some scripts may analyze specific attribute sets while other scripts may analyze patterns of attributes. That is, a particular script may be designed to detect a particular pattern (e.g., combination) of attributes and that combination of attributes enables the script to indicate that an on-chain program associated with the cryptographic token is malicious.

Figure 4:
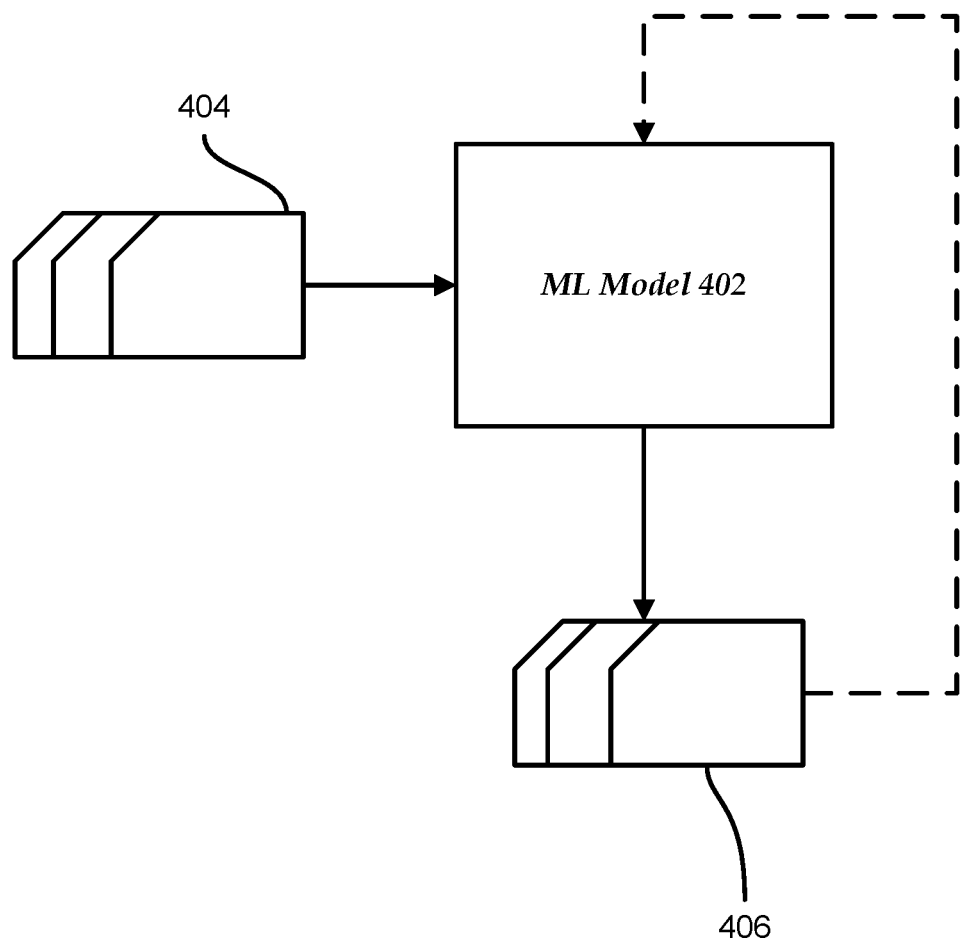
FIG. 4 illustrates an exemplary machine learning model, in accordance with one or more embodiments of this disclosure.

As mentioned above, some or all of the scripts may be generated based on outputs of a machine learning model. FIG. 4 illustrates an exemplary machine learning model. The machine learning model may have been trained using a plurality of attribute sets and corresponding labels indicating whether each attribute set corresponds to a malicious on-chain application (e.g., a scam cryptographic token). Machine learning model 402 may take input 404 (e.g., an attribute set as described above) and may output an indication (e.g., output 406) whether the attribute set is predicted to be associated with a malicious on-chain program. In some embodiments, output 406 may include a probability of whether the attribute set input into the machine learning model is associated with a malicious on-chain program. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, malware detection system 102 may train the machine learning model, using training subsystem 116. Training subsystem 116 may include software, hardware, or the combination of the two. In some embodiments, training subsystem 116 may train the machine learning model on node 104. Training subsystem 116 may perform the following operations when training the machine learning model. Training subsystem 116 may receive a plurality of attribute sets associated with respective labeled cryptographic tokens. For example, each attribute set may include a plurality of attributes for a particular cryptographic token (e.g., some or all attributes illustrated in FIG. 3). In addition, the training subsystem 116 may receive a label for each cryptographic token indicating whether the cryptographic token is associated with a malicious on-chain program or a non-malicious on-chain program. Each attribute set may also include an identifier associated with the cryptographic token associated with a particular attribute set.

In some embodiments, each attribute set may include a value for one or more of creation block data, number of holders, number of transfers, transfer duration, earliest transfer, or latest transfer for each labeled cryptographic token of the respective labeled cryptographic tokens. Training subsystem 116 may generate a plurality of vectors based on the plurality of attribute sets. For example, each attribute within the attribute set may be vectorized into a value that a training routine of the machine learning model is enabled to process. Training subsystem 116 may then train the machine learning model on the plurality of vectors to generate outputs of whether attributes for inputted cryptographic tokens indicate the malicious on-chain program. For example, training subsystem 116 may input, into a training routine of the machine learning model, the plurality of vectors.

In some embodiments, training subsystem 116 may update the machine learning model as new data is available. In particular, training subsystem 116 may receive attribute sets (e.g., one or more attributes shown in FIG. 3) corresponding to the cryptographic tokens identified by the machine learning model as corresponding to any malicious on-chain program. Training subsystem 116 may generate a supplemental training data set based on the attribute sets corresponding to the cryptographic tokens identified by the machine learning model as corresponding to any malicious on-chain program. When the dataset is generated, training subsystem 116 may retrain the machine learning model based on the supplemental training data set.

When the machine learning model is trained, attribute processing subsystem 114 may input attribute sets into the machine learning model to receive predictions indicating whether an on-chain program is malicious. Thus, the outputs of the machine learning model may include a probability of whether a set of inputted plurality of attributes corresponds to the malicious on-chain program. When the probability is output, attribute processing subsystem 114 may compare the probability to a probability threshold for determine whether the cryptographic tokens correspond to the malicious on-chain program. For example, a probability value may be preset to eighty percent or another suitable value (e.g., fifty percent, seventy five percent, etc.).

When the machine learning model outputs a value determined to indicate that the on-chain program is malicious, attribute processing subsystem 114 may generate a warning to a user. That is, in response to processing the first attribute set using the plurality of scripts, attribute processing subsystem 114 may generate a warning corresponding to the first cryptographic token. The warning may be sent to a user device (e.g., a smartphone or an electronic tablet) and may indicate to the user that the on-chain program is malicious. In some embodiments, the warning may be a message that includes an identifier of the corresponding cryptographic token (e.g., an address of the token contract on the blockchain) and any other metadata associated with the cryptographic token (e.g., cryptographic token name, description, etc.).

In some embodiments, the warning (e.g., a message to a user) may include a recommendation for generating a new script within the malware detection script database based on the attributes of the cryptographic token. For example, within the warning message, attribute processing subsystem 114 may generate a recommendation to generate a new script for the malware detection script database. The recommendation may be accompanied by instruction to generate a selectable option for the user to initiate creation of the script. Attribute processing subsystem 114 may receive a user input to generate the new script and in response to the user input, retrieve the first attribute set. Attribute processing subsystem 114 may pass the first set of attributes and a command to generate a new script to repository update subsystem 118.

Repository update subsystem 118 may include software, hardware, or the combination of the two. Repository update subsystem 118 may generate the new script to identify cryptographic tokens as malicious. In some embodiments, repository update subsystem 118 may generate the new script using the following operations. Repository update subsystem 118 may determine a malware type for the first cryptographic token and select a decision tree for generating the new script based on the type. The decision tree may be pre-built for various malware types and may include various script functions to be added to the script. Repository update subsystem 118 may use the decision tree to automatically generate the new script. In some embodiments, repository update subsystem 118 may transmit results to one or more devices associated with human experts and cause those devices to generate for display results of the machine learning process. For example, repository update subsystem 118 may cause the user device to generate for display a probability for each malware type in addition to collection data for the cryptographic token. The malware types may be selectable by each expert. Thus, an expert may confirm or override the malware type with the highest probability. In some embodiments, the selection (e.g., confirmation or override) may be fed into the training routine of the machine learning model and the machine learning model may be trained based on the selection.

In some embodiments, one or more scripts may include identifiers of on-chain programs that have been found to be malicious or not malicious. FIG. 5 illustrates a sample data 500 within the malware detection script database. Field 503 includes an indicator whether an on-chain program has been identified as malicious and field 506 may store an identifier of that on-chain program. In some embodiments, the identifier may be a contract address (e.g., a blockchain address) associated with the smart contract (e.g., on-chain program).

In some embodiments, repository update subsystem 118 may use a probability of the on-chain program being malicious in a determination whether to update the malware detection script database. Repository update subsystem 118 may determine a probability that the first on-chain program is malicious and generate a request to update the malware detection script database based on the probability. For example, repository update subsystem 118 may generate the request based on a probability being above a particular threshold (e.g., fifty percent seventy five percent, etc.).

In some embodiments, malware detection system 102 may perform these operations for different on-chain programs based on receiving an indication that a particular user is attempting to acquire cryptographic tokens associated with an on-chain program. For example, malware detection system 102 may detect a second on-chain program corresponding to a second cryptographic token for a second blockchain network. Malware detection system 102 may perform the detection based on receiving a transaction indication (e.g., having transaction attributes including an address of the on-chain program). Malware detection system 102 may determine a second attribute set for the second cryptographic token. For example, malware detection system 102 may determine the second attribute set using any technique described above with respect to the first attribute set.

When the second attribute set is determined, malware detection system 102 may process the second attribute set using the plurality of scripts stored in the malware detection script database that identifies the cryptographic tokens associated with the malicious on-chain program. Malware detection system 102 may perform this operation in the same manner as described above, in relation to processing the first attribute set. In response to processing the second attribute set, malware detection system 102 may generate an approval to perform a second blockchain operation corresponding to the second cryptographic token. For example, if the blockchain operation relates to acquiring a particular cryptographic token (or cryptographic tokens), malware detection system 102 may approve the operation, if the associated on-chain program is determined to not be malicious.

Computing Environment

Figure 6:
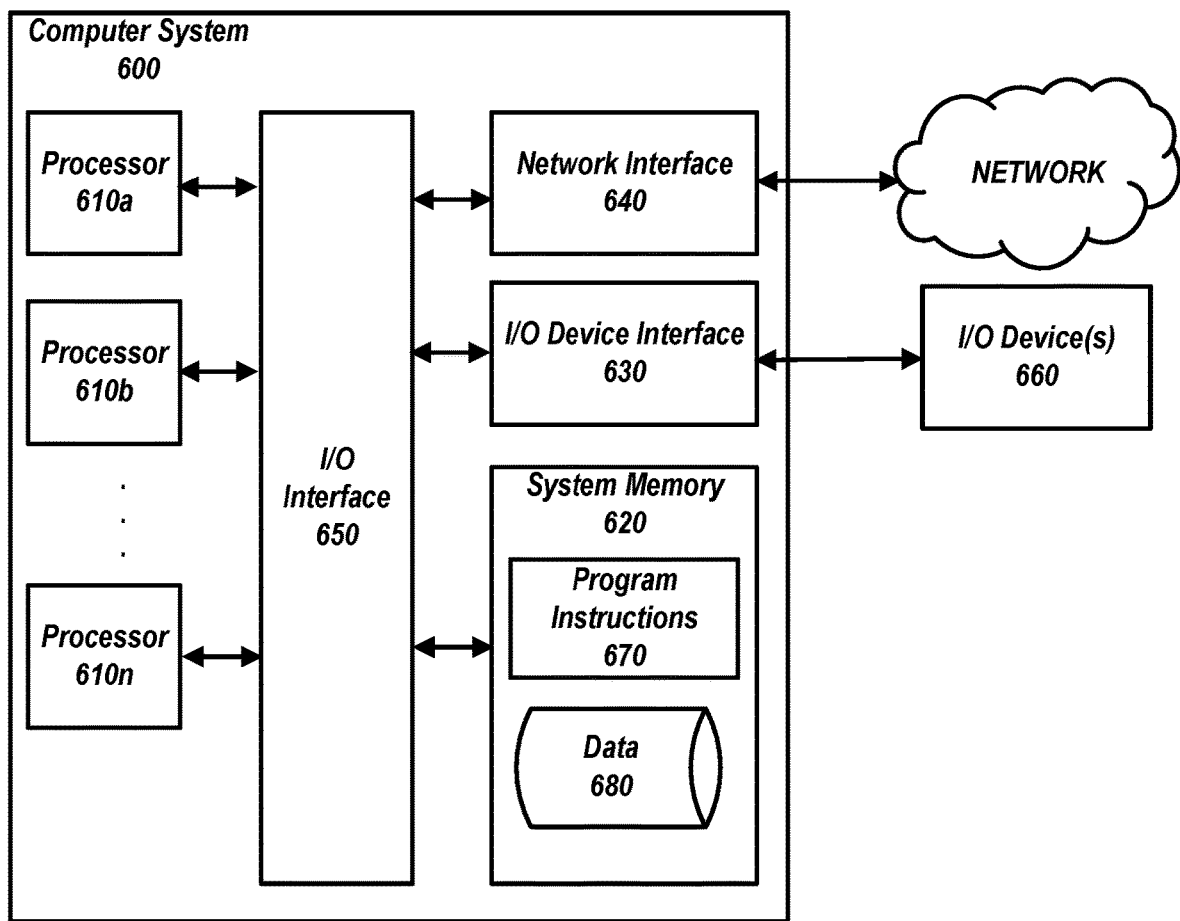
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer readable storage medium that may have program instructions stored thereon that are executable by a computer processor (e.g., one or more of processors 610a-610n) to cause the subject matter and the functional operations described herein. Memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
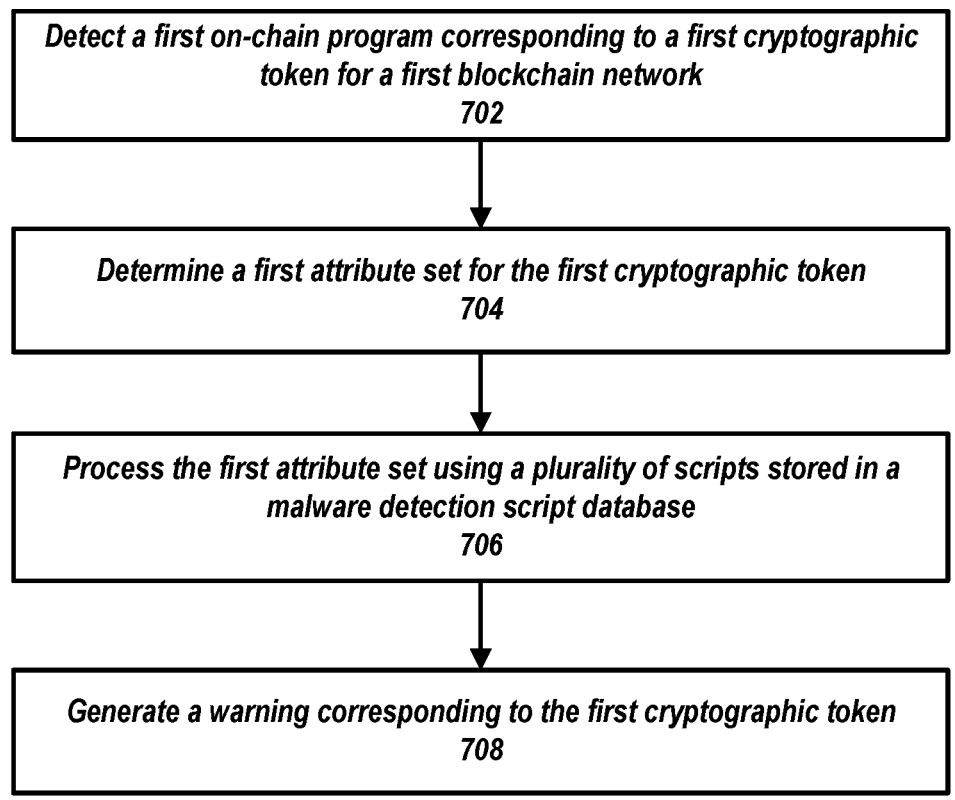
FIG. 7 is a flowchart of operations for detecting cryptographic tokens associated with malicious on-chain programs using scripts stored in a malware detection script database updated based on outputs of a machine learning model, in accordance with one or more embodiments of this disclosure.

FIG. 7 is a flowchart 700 of operations for detecting cryptographic tokens associated with malicious on-chain programs using scripts stored in a malware detection script database updated based on outputs of a machine learning model. The operations of FIG. 7 may use components described in relation to FIG. 6. In some embodiments, malware detection system 102 may include one or more components of computer system 600. At 702, malware detection system 102 detects a first on-chain program corresponding to a first cryptographic token for a first blockchain network. For example, malware detection system 102 may receive blockchain operation data or blockchain discovery data from data node 104 or from one of blockchain nodes 108a-108n. Malware detection system 102 may receive the blockchain operation data and/or blockchain discovery data over network 150 using network interface 640.

At 704, malware detection system 102 determines a first attribute set for the first cryptographic token. Malware detection system 102 may use one or more processors 610a, 610b, and/or 610n to perform the determination. At 706, malware detection system 102 processes the first attribute set using a plurality of scripts stored in a malware detection script database. For example, malware detection system 102 may use one or more processors 610a-610n to perform the operation and store the results in system memory 620. At 708, malware detection system 102 generates a warning corresponding to the first cryptographic token. For example, malware detection system 102 may use one or more processors 610a-610n to perform the operation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for detecting malicious cryptographic tokens using malware detection script databases that are updated based on outputs of machine learning models, the method comprising: detecting a first on-chain program corresponding to a first cryptographic token for a first blockchain network; determining a first attribute set for the first cryptographic token; processing the first attribute set using a plurality of scripts stored in a malware detection script database that identifies cryptographic tokens as corresponding to a malicious on-chain program, wherein the plurality of scripts is based on outputs of a machine learning model; and in response to processing the first attribute set using the plurality of scripts, generating a warning corresponding to the first cryptographic token.

2. Any of the preceding embodiments, wherein the machine learning model is trained by: receiving a plurality of attribute sets associated with respective labeled cryptographic tokens, wherein each attribute set comprise a value for one or more of creation block data, number of holders, number of transfers, transfer duration, earliest transfer, or latest transfer for each labeled cryptographic token of the respective labeled cryptographic tokens; generating a plurality of vectors based on the plurality of attribute sets; and training, the machine learning model, on the plurality of vectors to generate outputs of whether attributes for inputted cryptographic tokens indicate the malicious on-chain program.

3. Any of the preceding embodiments, wherein the outputs comprise a probability of whether a set of inputted plurality of attributes corresponds to the malicious on-chain program, and wherein the method further comprises comparing the probability to a probability threshold for determine whether the cryptographic tokens correspond to the malicious on-chain program.

4. Any of the preceding embodiments, further comprising: generating a recommendation to generate a new script for the malware detection script database; receiving a user input to generate the new script; in response to the user input, retrieving the first attribute set; and generating the new script to identify cryptographic tokens comprising the first attribute set as malicious.

5. Any of the preceding embodiments, wherein generating the new script further comprises: determining a type of malware for the first cryptographic token; selecting a decision tree for generating the new script based on the type; and using the decision tree to automatically generate the new script.

6. Any of the proceeding embodiments, wherein detecting the first on-chain program comprises receiving a request for a first blockchain operation, and wherein the first blockchain operation comprises exchanging the first cryptographic token with a second cryptographic token.

7. Any of the preceding embodiments, further comprising: detecting a second on-chain program corresponding to a second cryptographic token for a second blockchain network; determining a second attribute set for the second cryptographic token; processing the second attribute set using the plurality of scripts stored in the malware detection script database that identifies the cryptographic tokens associated with the malicious on-chain program, wherein the plurality of scripts is based on the outputs of the machine learning model; and in response to processing the second attribute set, generating an approval to perform a second blockchain operation corresponding to the second cryptographic token.

8. Any of the preceding embodiments, further comprising: receiving attribute sets corresponding to the cryptographic tokens identified by the machine learning model as corresponding to any malicious on-chain program; generating a supplemental training data set based on the attribute sets corresponding to the cryptographic tokens identified by the machine learning model as corresponding to any malicious on-chain program; and retraining the machine learning model based on the supplemental training data set.

9. Any of the preceding embodiments, wherein determining the first attribute set further comprises: performing a discovery script routine on the first on-chain program corresponding to the first cryptographic token; and receiving the first attribute set based on the discovery script routine.

10. Any of the preceding embodiments, wherein generating the warning corresponding to the first cryptographic token further comprising: determining a probability that the first on-chain program is malicious; and generating a request to update the malware detection script database based on the probability.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

14. A system comprising cloud-based circuitry for performing any of embodiments 1-10.

What is claimed is:

1. A system for detecting malicious on-chain programs using malware detection script databases that are updated based on outputs of machine learning models, the system comprising:
one or more processors and non-transitory media storing instructions that, when executed by the one or more processors, cause the one or more processors to perform operations comprising:
detecting a first on-chain program corresponding to a first cryptographic token for a first blockchain network;
processing the first on-chain program corresponding to the first cryptographic token using a plurality of scripts stored in a malware detection script database that identifies malicious on-chain programs corresponding to cryptographic tokens, wherein the plurality of scripts is based on outputs of a machine learning model, and wherein the machine learning model is trained by:
receiving a plurality of attribute sets associated with respective labeled on-chain programs corresponding to respective labeled cryptographic tokens, wherein each attribute set comprises a value for one or more of creation block data, number of holders, number of transfers, transfer duration, earliest transfer, or latest transfer for each labeled cryptographic token of the respective labeled cryptographic tokens;
generating a plurality of vectors based on the plurality of attribute sets; and
training the machine learning model on the plurality of vectors to generate outputs of whether attributes for inputted cryptographic tokens indicate a malicious on-chain program; and
in response to processing the first on-chain program corresponding to the first cryptographic token using the plurality of scripts, generating a warning corresponding to the first cryptographic token.

2. A method for detecting malicious cryptographic tokens using malware detection script databases that are updated based on outputs of machine learning models, the method comprising:
detecting a first on-chain program corresponding to a first cryptographic token for a first blockchain network;
determining a first attribute set for the first cryptographic token;
processing the first attribute set using a plurality of scripts stored in a malware detection script database that identifies cryptographic tokens as corresponding to a malicious on-chain program, wherein the plurality of scripts is based on outputs of a machine learning model; and
in response to processing the first attribute set using the plurality of scripts, generating a warning corresponding to the first cryptographic token, wherein generating the warning comprises:
determining a probability that the first on-chain program is malicious; and
generating a request to update the malware detection script database based on the probability.

3. The method of claim 2, wherein the machine learning model is trained by:
receiving a plurality of attribute sets associated with respective labeled cryptographic tokens, wherein each attribute set comprises a value for one or more of creation block data, number of holders, number of transfers, transfer duration, earliest transfer, or latest transfer for each labeled cryptographic token of the respective labeled cryptographic tokens;
generating a plurality of vectors based on the plurality of attribute sets; and
training the machine learning model on the plurality of vectors to generate outputs of whether attributes for inputted cryptographic tokens indicate the malicious on-chain program.

4. The method of claim 3, wherein the outputs comprise a probability of whether a set of inputted plurality of attributes corresponds to the malicious on-chain program, and wherein the method further comprises comparing the probability to a probability threshold for determining whether the cryptographic tokens correspond to the malicious on-chain program.

5. The method of claim 2, further comprising:
generating a recommendation to generate a new script for the malware detection script database;
receiving a user input to generate the new script;
in response to the user input, retrieving the first attribute set; and
generating the new script to identify cryptographic tokens comprising the first attribute set as malicious.

6. The method of claim 5, wherein generating the new script further comprises:
determining a type of malware type for the first cryptographic token;
selecting a decision tree for generating the new script based on the type; and
using the decision tree to automatically generate the new script.

7. The method of claim 2, wherein detecting the first on-chain program comprises receiving a request for a first blockchain operation, and wherein the first blockchain operation comprises exchanging the first cryptographic token with a second cryptographic token.

8. The method of claim 2, further comprising:
detecting a second on-chain program corresponding to a second cryptographic token for a second blockchain network;
determining a second attribute set for the second cryptographic token;
processing the second attribute set using the plurality of scripts stored in the malware detection script database that identifies the cryptographic tokens associated with the malicious on-chain program, wherein the plurality of scripts is based on the outputs of the machine learning model; and
in response to processing the second attribute set, generating an approval to perform a second blockchain operation corresponding to the second cryptographic token.

9. The method of claim 2, further comprising:
receiving attribute sets corresponding to the cryptographic tokens identified by the machine learning model as corresponding to any malicious on-chain program;
generating a supplemental training data set based on the attribute sets corresponding to the cryptographic tokens identified by the machine learning model as corresponding to any malicious on-chain program; and
retraining the machine learning model based on the supplemental training data set.

10. The method of claim 2, wherein determining the first attribute set comprises:
performing a discovery script routine on the first on-chain program corresponding to the first cryptographic token; and
receiving the first attribute set based on the discovery script routine.

11. One or more non-transitory, computer-readable media storing instructions that, when executed by one or more processors, cause operations comprising:
detecting a first on-chain program corresponding to a first cryptographic token for a first blockchain network;
performing a discovery script routine on the first on-chain program corresponding to the first cryptographic token;
receiving a first attribute set for the first cryptographic token based on the discovery script routine;
processing the first attribute set using a plurality of scripts stored in a malware detection script database that identifies cryptographic tokens as corresponding to a malicious on-chain program, wherein the plurality of scripts is based on outputs of a machine learning model; and
in response to processing the first attribute set using the plurality of scripts, generating a warning corresponding to the first cryptographic token.

12. The one or more non-transitory, computer-readable media of claim 11, wherein the machine learning model is trained by:
receiving a plurality of attribute sets associated with respective labeled cryptographic tokens, wherein each attribute set comprises a value for one or more of creation block data, number of holders, number of transfers, transfer duration, earliest transfer, or latest transfer for each labeled cryptographic token of the respective labeled cryptographic tokens;
generating a plurality of vectors based on the plurality of attribute sets; and
training the machine learning model on the plurality of vectors to generate outputs of whether attributes for inputted cryptographic tokens indicate the malicious on-chain program.

13. The one or more non-transitory, computer-readable media of claim 12, wherein the outputs comprise a probability of whether a set of inputted plurality of attributes corresponds to the malicious on-chain program, and wherein the one or more processors further compare the probability to a probability threshold for determine whether the cryptographic tokens correspond to the malicious on-chain program.

14. The one or more non-transitory, computer-readable media of claim 11, the operations further comprising:
generating a recommendation to generate a new script for the malware detection script database;
receiving a user input to generate the new script;
in response to the user input, retrieving the first attribute set; and
generating the new script to identify cryptographic tokens comprising the first attribute set as malicious.

15. The one or more non-transitory, computer-readable media of claim 14, wherein the instructions for generating the new script comprises:
determining a type of malware type for the first cryptographic token;
selecting a decision tree for generating the new script based on the type; and
using the decision tree to automatically generate the new script.

16. The one or more non-transitory, computer-readable media of claim 11, wherein the instructions for detecting the first on-chain program further cause the one or more processors to receive a request for a first blockchain operation, and wherein the first blockchain operation comprises exchanging the first cryptographic token with a second cryptographic token.

17. The one or more non-transitory, computer-readable media of claim 12, the operations further comprising:
detecting a second on-chain program corresponding to a second cryptographic token for a second blockchain network;
determining a second attribute set for the second cryptographic token;
processing the second attribute set using the plurality of scripts stored in the malware detection script database that identifies the cryptographic tokens associated with the malicious on-chain program, wherein the plurality of scripts is based on the outputs of the machine learning model; and
in response to processing the second attribute set, generating an approval to perform a second blockchain operation corresponding to the second cryptographic token.

18. The one or more non-transitory, computer-readable media of claim 11, the operations further comprising:
receiving attribute sets corresponding to the cryptographic tokens identified by the machine learning model as corresponding to any malicious on-chain program;
generating a supplemental training data set based on the attribute sets corresponding to the cryptographic tokens identified by the machine learning model as corresponding to any malicious on-chain program; and
retraining the machine learning model based on the supplemental training data set.

* * * * *